(12) United States Patent
Lee et al.

(10) Patent No.: US 12,634,383 B2
(45) Date of Patent: May 19, 2026

(54) SIGNAL PROCESSING METHOD AND ASSOCIATED RELAY DEVICE

(71) Applicant: Realtek Semiconductor Corp., HsinChu (TW)

(72) Inventors: Che-Yen Lee, HsinChu (TW); Cheng-Hung Wu, HsinChu (TW); Ji-De Lin, HsinChu (TW); Je-Yu Tsai, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 77 days.

(21) Appl. No.: 18/736,497

(22) Filed: Jun. 6, 2024

(65) Prior Publication Data

US 2024/0422247 A1 Dec. 19, 2024

(30) Foreign Application Priority Data

Jun. 16, 2023 (TW) .................................. 112122586

(51) Int. Cl.
*H04L 69/08* (2022.01)
*G06F 3/14* (2006.01)
*H04L 69/00* (2022.01)
(52) U.S. Cl.
CPC ................. *H04L 69/08* (2013.01); *G06F 3/14* (2013.01); *H04L 69/26* (2013.01)
(58) Field of Classification Search
CPC .......... H04L 69/08; H04L 69/26; G06F 3/14; G09G 5/006
See application file for complete search history.

(56) References Cited

U.S. PATENT DOCUMENTS

| | | | | |
|---|---|---|---|---|
| 8,422,518 | B2 * | 4/2013 | Guan | H04N 7/083 370/510 |
| 11,490,139 | B1 * | 11/2022 | Lin | H04N 21/4316 |
| 11,995,022 | B2 * | 5/2024 | Kabiry | G06F 13/4068 |
| 12,183,311 | B2 * | 12/2024 | Kaliyamoorthy | G09G 5/399 |
| 12,271,249 | B2 * | 4/2025 | Ansari | G06F 1/3265 |
| 2008/0240152 | A1 * | 10/2008 | Quinn | G06F 3/14 370/466 |
| 2011/0145877 | A1 * | 6/2011 | Kobayashi | G09G 5/006 725/115 |
| 2013/0021352 | A1 * | 1/2013 | Wyatt | G09G 5/395 345/520 |

(Continued)

FOREIGN PATENT DOCUMENTS

| | | | | |
|---|---|---|---|---|
| KR | 102516484 | B1 * | 4/2023 | ........... G06F 3/1415 |
| TW | 201536040 | A | 9/2015 | |

OTHER PUBLICATIONS

"VESA DisplayPort (DP) Standard", Video Electronics Standards Association, Oct. 10, 2022.

*Primary Examiner* — Oanh Duong
(74) *Attorney, Agent, or Firm* — Winston Hsu

(57) ABSTRACT

The present invention provides a signal processing method, wherein the signal processing method includes the steps of: receiving a MST packet that complies with a DP specification; converting the MST packet into multiple SST packets; determining a number of valid data symbols in a transfer unit included in the multiple SST packets based on information of a horizontal blanking interval indicated by the MST packet or the multiple SST packets; and transmitting the multiple SST packets to a back-end device.

8 Claims, 8 Drawing Sheets

TU size : 32 symbols
First TU : 16 valid data symbols, 16 stuffed data symbols
Second TU : 20 valid data symbols, 12 stuffed data symbols

(56)                 References Cited

U.S. PATENT DOCUMENTS

| | | | | |
|---|---|---|---|---|
| 2015/0264298 A1* | 9/2015 | Colenbrander | ........ | G09G 5/001 |
| | | | | 345/547 |
| 2015/0355762 A1* | 12/2015 | Tripathi | ................... | H04N 3/24 |
| | | | | 345/173 |
| 2020/0257649 A1* | 8/2020 | Kabiry | ................ | G06F 13/4282 |
| 2020/0372852 A1* | 11/2020 | Ishiwata | ............. | G09G 3/2096 |

* cited by examiner 32 symbols
or
64 symbols

Valid data symbols

Filling start (FS)

Stuffed data symbols

Filling end (FE)

TU size : 32 symbols
First TU : 16 valid data symbols, 16 stuffed data symbols
Second TU : 20 valid data symbols, 12 stuffed data symbols

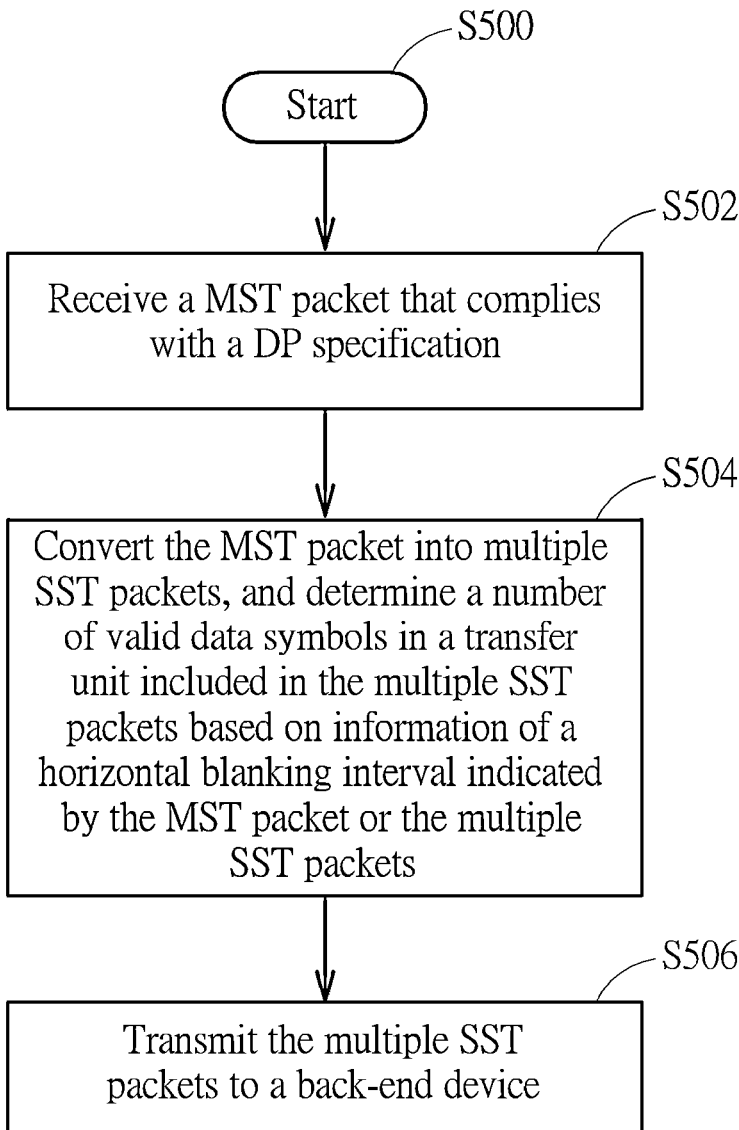

S500

Start

S502

Receive a MST packet that complies
with a DP specification

S504

Convert the MST packet into multiple
SST packets, and determine a number
of valid data symbols in a transfer
unit included in the multiple SST
packets based on information of a
horizontal blanking interval indicated
by the MST packet or the multiple
SST packets

S506

Transmit the multiple SST
packets to a back-end device

FIG. 5

SIGNAL PROCESSING METHOD AND ASSOCIATED RELAY DEVICE

BACKGROUND OF THE INVENTION

1. Field of the Invention

The present invention relates to a DisplayPort (DP) signal processing method.

2. Description of the Prior Art

The image generation device can have two modes for generating DP signals, wherein one is a single stream transport (SST) mode, and the other is a multi-stream transport (MST) mode. In MST mode, the MST packet has 64 time slots for data transmission, and the image generation device will assign time slots according to a bandwidth of the data that needs to be transmitted. For example, only time slots #1-#5 in the MST packet can be used to carry valid data of one stream, while the remaining time slots are used to carry valid data of other streams or no data. Therefore, when only part of the time slots are used to carry data of one stream, jitter will occur because the data needs to wait until the allocated time slots for transmission. In addition, the above operation may also cause the horizontal blanking interval of the image data to be unstable, causing processing problems for the back-end device.

SUMMARY OF THE INVENTION

Therefore, one of the objectives of the present invention is to provide a signal processing method that can process the size of the horizontal blanking interval in the MST packet generated by the image generation device, to solve the problems described in the prior art.

In one embodiment of the present invention, a signal processing method comprises the steps of: receiving a MST packet that complies with a DP specification; converting the MST packet into multiple SST packets; determining a number of valid data symbols in a transfer unit included in the multiple SST packets based on information of a horizontal blanking interval indicated by the MST packet or the multiple SST packets; and transmitting the multiple SST packets to a back-end device.

In one embodiment of the present invention, a relay device comprising a receiving circuit, a processing circuit and a transmitting circuit is disclosed. The receiving circuit is configured to receive a packet that complies with a DP specification. The processing circuit is coupled to the receiving circuit, and is configured to convert the MST packet into multiple SST packets, and determine a number of valid data symbols in a transfer unit included in the multiple SST packets based on information of a horizontal blanking interval indicated by the MST packet or the multiple SST packets. The transmitting circuit is configured to transmit the multiple SST packets to a back-end device.

In one embodiment of the present invention, a signal processing method comprises the steps of: receiving an EDID from a back-end device; adjusting a size of a horizontal blanking interval included in the EDID to generate an adjusted EDID; and transmitting the adjusted EDID to an image generation device for generating a MST packet that complies with a DP specification.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a flowchart of a signal processing method according to one embodiment of the present invention.

DETAILED DESCRIPTION

Figure 1:
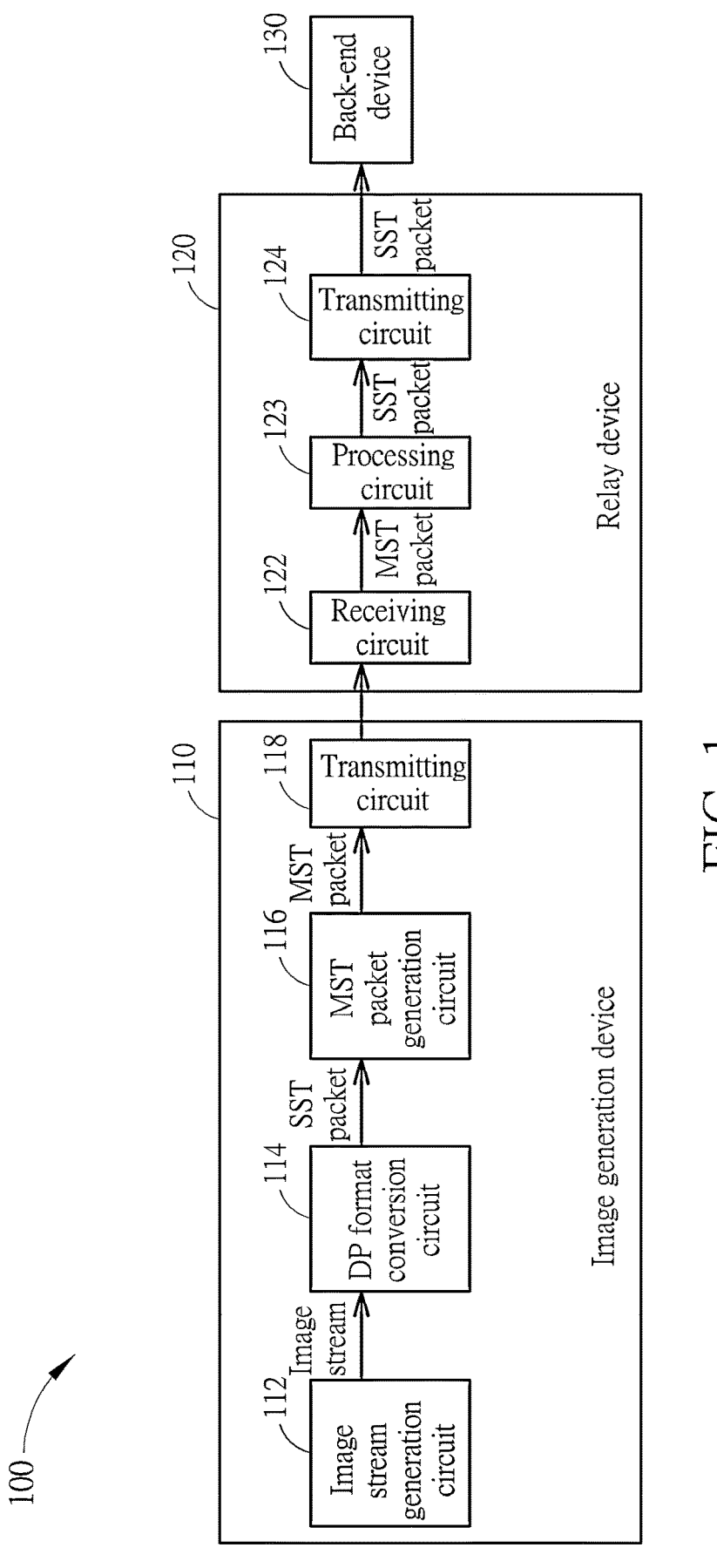
FIG. 1 is a diagram illustrating a system according to one embodiment of the present invention.

FIG. 1 is a diagram illustrating a system 100 according to one embodiment of the present invention. As shown in FIG. 1, the system 100 comprises an image generation device 110, a relay device 120 and a back-end device 130. The image generation device 110 comprises an image stream generation circuit 112, a DP format conversion circuit 114, an MST packet generation circuit 116 and a transmitting circuit 118; and the relay device 120 comprises a receiving circuit 122, a processing circuit 123 and a transmitting circuit 124. In this embodiment, the image generation device 110 can be a graphics processing unit (GPU) or any circuit or device that can generate MST packets that comply with the DP specification. The relay device 120 can be a branch device, a converter/translator, or any other circuit or device that can convert MST packets that comply with DP specifications into SST packets. The back-end device 130 can be any monitor or display panel that can receive SST packets from the relay device 120 and process the SST packets for image display.

In the operation of the image generation device 110, the image stream generation circuit 112 is used to generate an image stream, wherein the image stream complies with a Video Electronics Standards Association (VESA) specification. Then, the DP format conversion circuit 114 performs format conversion on the image stream to generate an SST packet that meets the DP specification. The MST packet generation circuit 116 schedules the SST packet to generate an MST packet, and the MST packet is sent to the relay device 120 through the transmitting circuit 118.

Figure 2:
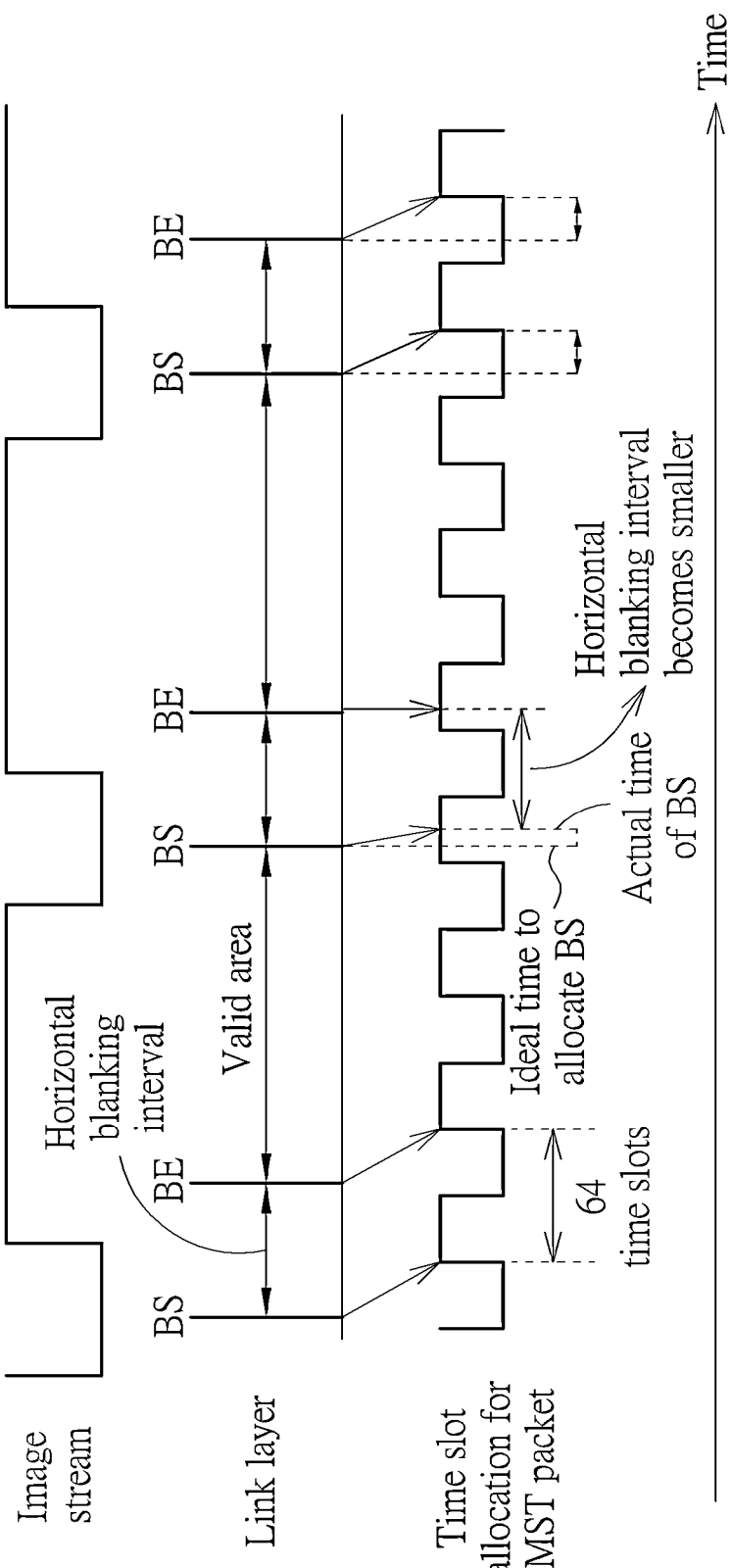
FIG. 2 is a diagram of an image stream generated by an image stream generation circuit, part of signal content of the link layer in the DP format conversion circuit and time slot configuration corresponding to the MST packet according to one embodiment of the present invention.

FIG. 2 is a diagram of the image stream generated by the image stream generation circuit 112, part of signal content of a link layer in the DP format conversion circuit 114 and time slot configuration corresponding to the MST packet according to one embodiment of the present invention. As shown in FIG. 2, the image stream generated by the image stream generation circuit 112 includes a blank area and a valid area (also known as active area), where a low level in FIG. 2 represents the blank area and the high level represents the valid area. The output signal of the link layer includes the blanking start (BS), the blanking end (BE) and the data therein. For example, the period between the beginning of BS and the following BE is the horizontal blanking interval, and the period between the beginning of BS and the following BE can include filling data, secondary data, etc. The period between the beginning of BE and the following BS is the valid area, and the period between BE and the following BS includes filling data, valid image data, etc. Regarding time slot configuration of the MST packet, this embodiment assumes that only 32 time slots among the 64 time slots included in an MST packet can be used to transmit the image stream, where the 32 time slots (for example, the $1^{st}$ to $32^{nd}$ time slots) that can be used to transmit the image stream are represented by a high level in FIG. 2, and the 32 time slots (for example, the $33^{rd}$ to $64^{th}$ time slots) that cannot be used to transmit the image stream are represented by a low level in FIG. 2. As shown in FIG. 2, since the time point when the BS is generated at the link layer may correspond to the $33^{rd}$ to $64^{th}$ time slots in the MST packet that cannot be used to transmit this image stream, there will be a delay in the horizontal blanking interval between the BS and the following BE. In addition, in the horizontal blanking interval from the $2^{nd}$ BS to the $2^{nd}$ BE shown in FIG. 2, since the time point when the BS is generated at the link layer corresponds to the $1^{st}$ to $32^{nd}$ time slots in the MST packet that can be used to transmit the video stream, and the time point when the link layer generates BE also corresponds to the $1^{st}$ to $32^{nd}$ time slots in the MST packet that can be used to transmit this image stream, and the time when BS and BE are allocated into the MST packet will change due to the delay of the previous data, so the horizontal blanking interval from the BS to the following BE will also be different in the MST packet. In this embodiment, the BS has a larger delay when being allocated in the MST packet, and the BE has a smaller delay when being allocated in the MST packet, therefore, the horizontal blanking interval from the BS to the following BE will become smaller in the MST packet.

As shown in FIG. 2, since only part of the time slots of the MST packet can be used for the image stream, the size of the corresponding horizontal blanking interval in the MST packet will vary with the time points when the BS and BE are generated. Taking FIG. 2 as an example, the first horizontal blanking interval will be larger/longer in the MST packets, while the second horizontal blanking interval will be smaller/shorter in the MST packets, even if these horizontal blanking intervals generated by the link layer are the same. The problem that the length of the horizontal blanking interval is not fixed will cause processing problems for the back-end circuit, especially when the horizontal blanking interval is too small, the back-end circuit may not be able to immediately decode the control symbols or secondary data carried in the horizontal blanking interval, resulting in the failure of some auxiliary functions, such as back-end device 130 is unable to receive the audio signal.

In order to solve the above problem, this embodiment adjusts the valid data amount of a transfer unit (TU) in the relay device 120 to prevent the back-end device 130 from being unable to instantly decode the control symbols or secondary data carried in the horizontal blanking interval.

Figure 3:
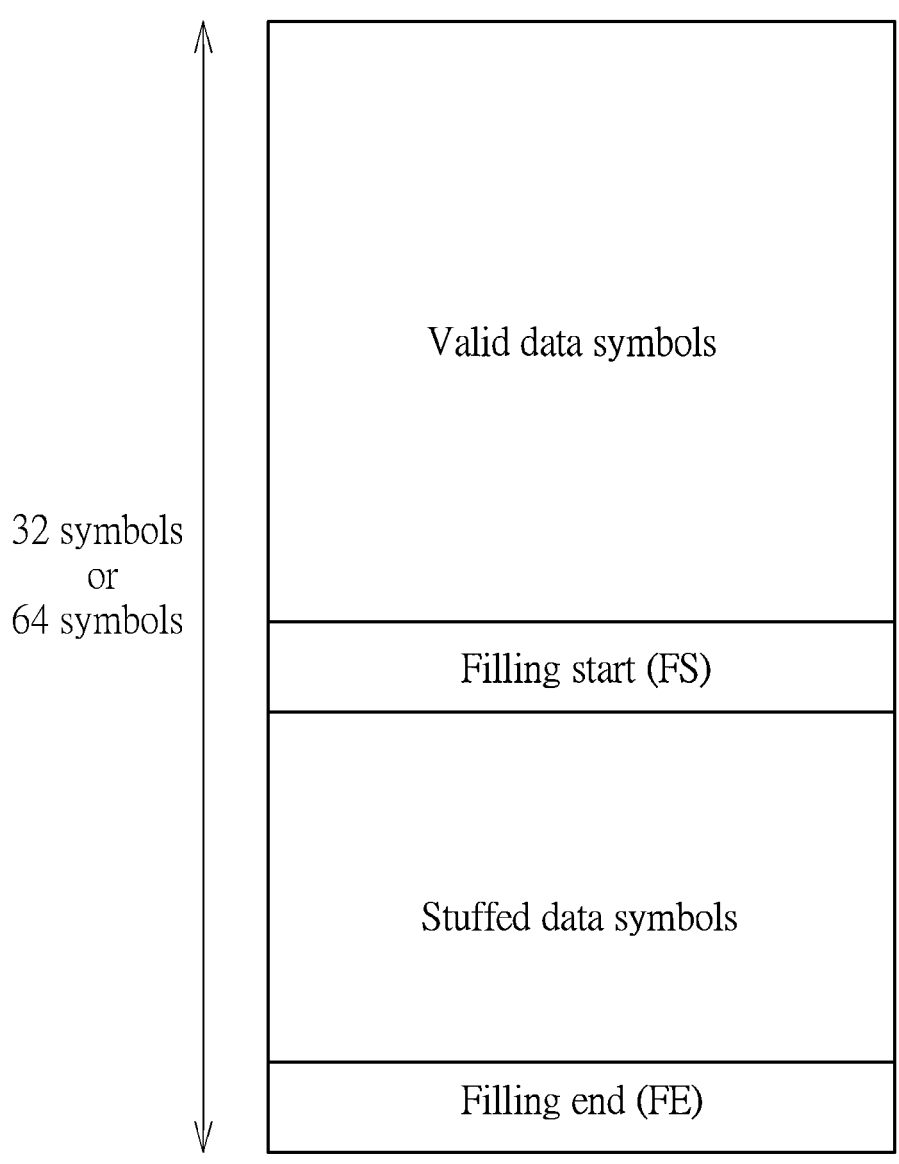
FIG. 3 is a diagram illustrating a transfer unit.

In the operation of the relay device 120, in a first embodiment, the receiving circuit 122 receives the MST packets from the image generation device 110, and the processing circuit 123 converts the received MST packets into the SST packets, and determines the valid data amount in the transfer unit in the SST packets. Specifically, the processing circuit 123 can analyze the timing information of the MST packets in the process of converting the MST packets into the SST packets, such as determining the horizontal blanking interval indicated by the time slot configuration of the MST packets shown in FIG. 2 and/or stream clock information, to determine the valid data amount of the transfer units in the SST packets, so that the generated SST packets can keep the size of the horizontal blanking interval within an appropriate range. For example, referring to the transfer unit shown in FIG. 3, the transfer unit in the SST packet includes 32 symbols or 64 symbols. As shown in FIG. 3, the transfer unit includes multiple valid data symbols, a filling start (FS), multiple stuffed data symbols and a filling end (FE), where the multiple valid data symbols correspond to the data in the image stream, such as the horizontal blanking interval, valid image data of the valid area, etc., and the multiple stuffed symbols are dummy data or invalid data. It should be noted that since the format and functions of the transfer unit in FIG. 3 have been clearly described in the DP specification, the details will not be described here. Then, referring to FIG. 4, if the processing circuit 123 determines that the size of the horizontal blanking interval indicated by the time slot configuration of the MST packet shown in FIG. 2 is normal (e.g., within a range or higher than a threshold value), the processing circuit 123 can determine that the SST packet has a first transfer unit 410, where the first transfer unit 410 includes 32 symbols, and the 32 symbols include 16 valid data symbols and 16 stuffed data symbols. If the processing circuit 123 determines that the size of the horizontal blanking interval indicated by the time slot configuration of the MST packet shown in FIG. 2 is too small (e.g., lower than a threshold value), the processing circuit 123 can determine that the SST packet has a second transfer unit 420, where the second transfer unit 420 includes 32 symbols, and the 32 symbols include 20 valid data symbols and 12 stuffed data symbols. As mentioned above, after receiving the MST packets, the processing circuit 123 will analyze the size of the horizontal blanking interval to determine the number of valid data symbols in the transfer unit, and the number of the overall transfer units will be changed accordingly due to the determined number of valid data symbols in the transfer unit. For example, the SST packet shown in FIG. 4 requires more first transfer units 410 to transmit all valid data symbols, while the SST packet only requires less second transfer units 420 for transmitting all valid data symbols, so the size/length of the horizontal blanking interval can be adjusted.

Figure 4:
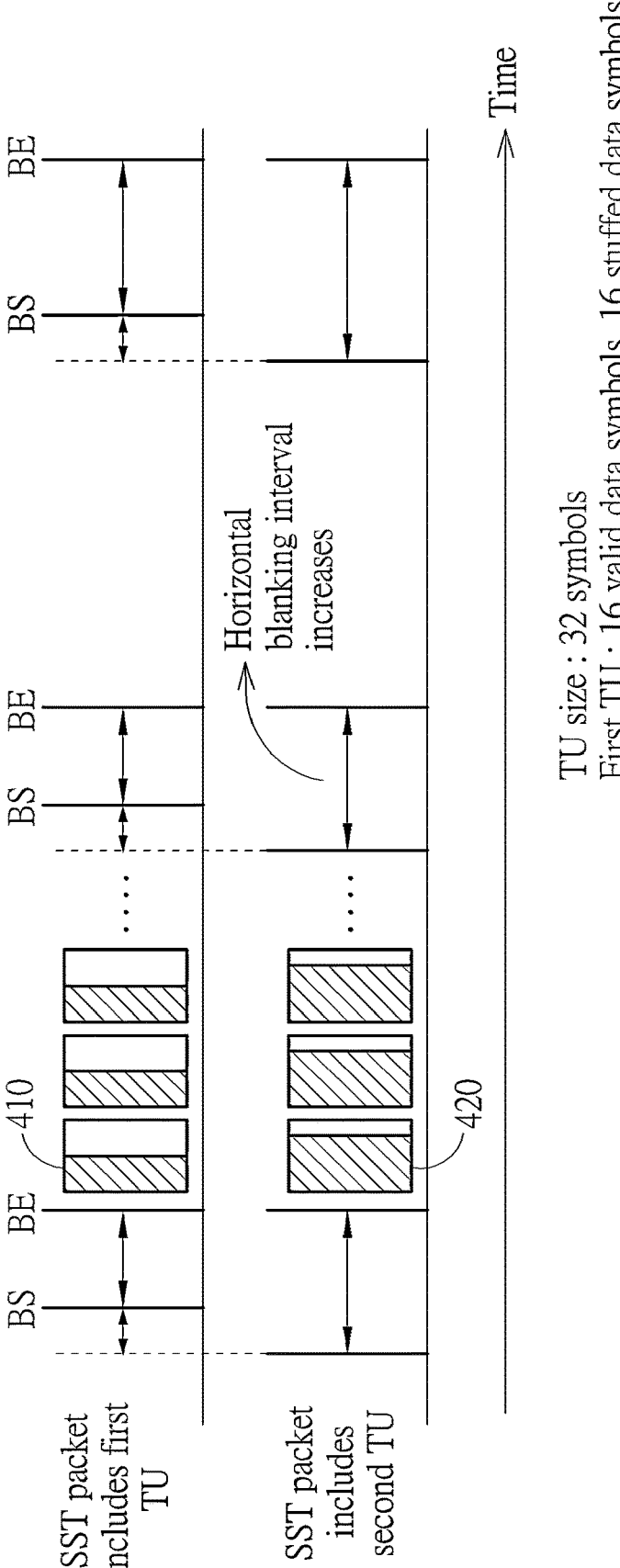
FIG. 4 is a diagram of increasing the number of valid data symbols in the transfer unit.

In a second embodiment, the receiving circuit 122 receives the MST packets from the image generation device 110, and the processing circuit 123 converts the received MST packets into SST packets, wherein the SST packet has the first transfer unit 410. Then, the processing circuit 123 measures the horizontal blanking interval of the SST packet to determine whether to adjust the number of valid data symbols of the first transfer unit 410 to generate the second transfer unit 420. Specifically, if the processing circuit 123 measures that the size of the horizontal blanking interval indicated by the SST packet is normal (e.g., within a range or higher than a threshold value), the processing circuit 123 can determine that the SST packet has the first transfer unit 410, and there is no need to adjust the number of valid data symbols in the first transfer unit 410. In addition, if the processing circuit 123 measures that the horizontal blanking interval indicated by the SST packet is too small (e.g., lower than a threshold value), the processing circuit 123 can adjust the number of valid data symbols of the first transfer unit 420 to generate the second transfer unit 420, as shown in FIG. 4, where the number of valid data symbols in the second transfer unit 420 is higher than the number of valid data symbols in the first transfer unit 410. As mentioned above, since the processing circuit 123 measures the horizontal blanking interval of the SST packet to determine the number of valid data symbols in the transfer unit, the number of the overall transfer units will be changed accordingly due to the determined number of valid data symbols in the transfer unit. For example, the SST packet shown in FIG. 4 requires more first transfer units 410 to transmit all valid data symbols, while the SST packet only requires less second transfer units 420 for transmitting all valid data symbols, so the size/length of the horizontal blanking interval can be adjusted.

In addition, the transmitting circuit 124 transmits these SST packets generated by the processing circuit 123 to the back-end device 130.

In another embodiment, the processing circuit 123 can only adjust some transfer units in the multiple SST packets, that is, only increase the number/proportion of valid data symbols in some transfer units, and the number/proportion of valid data symbols of the remaining transfer units is unchanged. This alternative design should fall within the scope of the present invention.

As mentioned above, by increasing the valid data symbols in the transfer unit as shown in FIG. 4, it can solve the problem that the original horizontal blanking interval is too small and may cause the back-end device 130 to be unable to decode the control symbols and secondary data carried in the horizontal blanking interval immediately.

In one embodiment, the processing circuit 123 can obtain the sizes of multiple horizontal blanking intervals received within a period of time, and determine if increasing or decreasing the number of valid data symbols in the transfer units according to a minimum horizontal blanking interval or a maximum horizontal blanking interval among the multiple horizontal blanking intervals. For example, if the processing circuit 123 determines that the maximum horizontal blanking interval is higher than a threshold value, the processing circuit 123 can reduce the number/proportion of valid data symbols in each transfer unit; and if the processing circuit 123 determines that the minimum horizontal blanking interval is lower than a threshold value, the processing circuit 123 can increase the number/proportion of valid data symbols in each transfer unit, to stabilize the size of the horizontal blanking interval.

FIG. 5 is a flowchart of a signal processing method according to one embodiment of the present invention. Referring to the above embodiments, the flow of the signal processing method is described as follows.

Step S500: the flow starts.

Step S502: receive a MST packet that complies with a DP specification.

Step S504: convert the MST packet into multiple SST packets, and determine a number of valid data symbols in a transfer unit included in the multiple SST packets based on information of a horizontal blanking interval indicated by the MST packet or the multiple SST packets.

Step S506: transmit the multiple SST packets to a back-end device.

Figure 6:
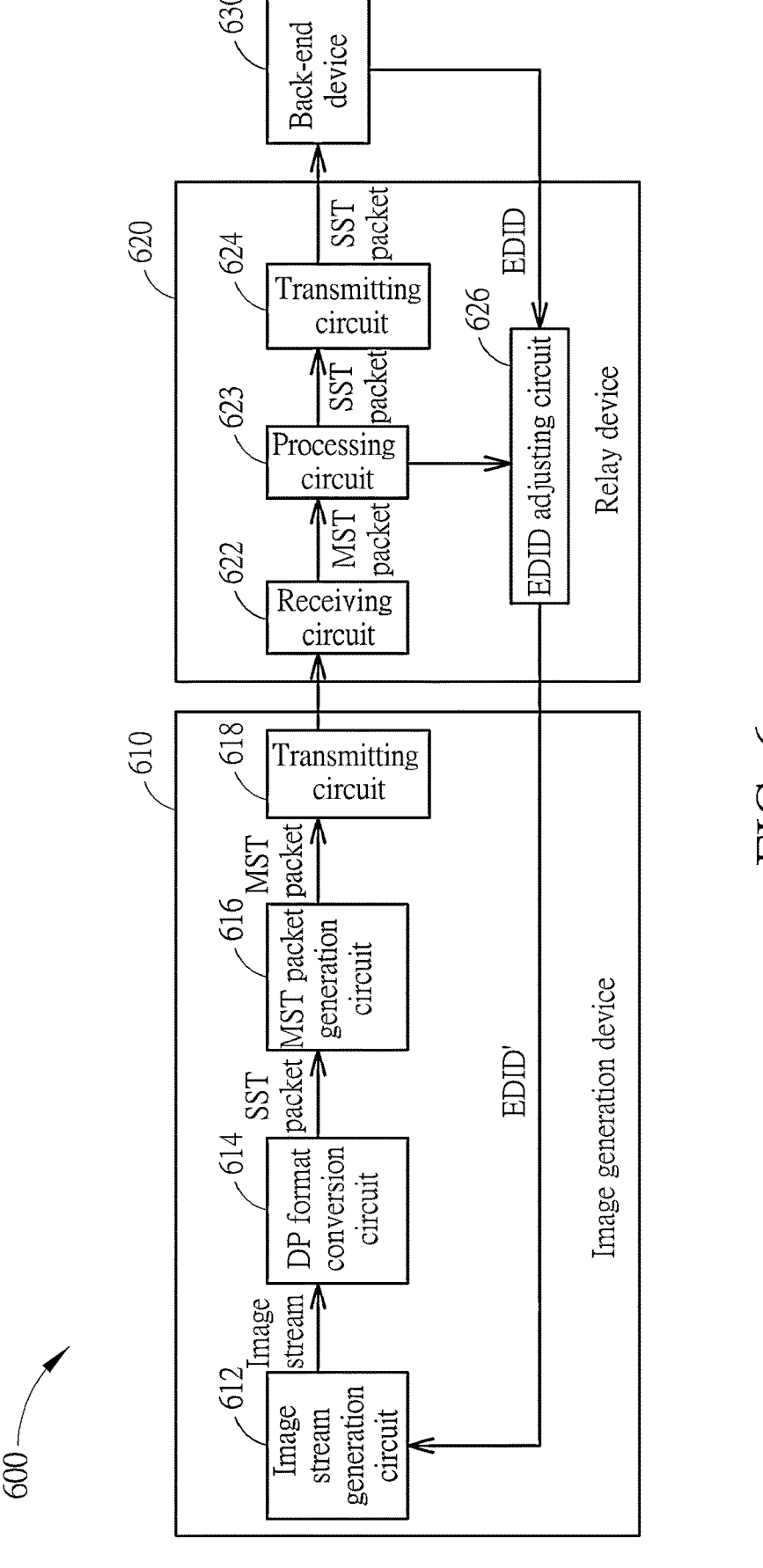
FIG. 6 is a diagram illustrating a system according to one embodiment of the present invention.

FIG. 6 is a diagram illustrating a system 600 according to one embodiment of the present invention. As shown in FIG. 6, the system 600 comprises an image generation device 610, a relay device 620 and a back-end device 630. The image generation device 610 comprises an image stream generation circuit 612, a DP format conversion circuit 614, an MST packet generation circuit 616 and a transmitting circuit 618; and the relay device 620 comprises a receiving circuit 622, a processing circuit 623, a transmitting circuit 624 and an Extended Display Identification Data (EDID) adjusting circuit 626. In this embodiment, the image generation device 610 can be any circuit or device that can generate MST packets that comply with the DP specification. The relay device 620 can be a branch device, a converter/translator, or any other circuit or device that can convert MST packets that comply with DP specifications into SST packets. The back-end device 630 can be any monitor or display panel that can receive and process the SST packets for image display.

In the operation of the system 600, the image stream generation circuit 612 is used to generate an image stream, wherein the image stream complies with a VESA specification. Then, the DP format conversion circuit 614 performs format conversion on the image stream to generate an SST packet that meets the DP specification. The MST packet generation circuit 616 schedules the SST packet to generate an MST packet, and the MST packet is sent to the relay device 620 through the transmitting circuit 618. Then, after the receiving circuit 622 of the relay device 620 receives the MST packet from the image generating device 610, the processing circuit 623 converts the received MST packet into the SST packet and transmits it to the back-end device 630 through the transmitting circuit 624, for subsequent decoding and display.

As described in FIG. 2, since the size of the corresponding horizontal blanking interval in the MST packet will change with the different time points when the BS and BE are generated, the problem that the length of the horizontal blanking interval is not fixed will cause processing problems for the back-end circuit, especially when the horizontal blanking interval is too small, the back-end circuit may not be able to immediately decode the control symbols or secondary data carried in the horizontal blanking interval, resulting in the failure of some auxiliary functions.

In order to solve the above problem, this embodiment proposes the EDID adjustment circuit 626 in the relay device 620, which can adjust the EDID information read from the back-end device 630 to prevent the back-end device 630 from being unable to decode the control symbols and secondary data carried in the horizontal blanking interval immediately.

Specifically, the back-end device 630 stores display-related information in its own memory, such as the EDID established by the VESA. The EDID includes display-related information, such as manufacturer name, serial number, supported resolution, sound formats, multiple monitor parameters, etc. The EDID adjusting circuit 626 will read the EDID from the back-end device 630, and adjust the size of the horizontal blanking interval included in the read EDID to generate an adjusted EDID (EDID' in FIG. 6). The adjusted EDID is then sent to the image stream generation circuit 612 in the image generation device 610, so that the image stream generation circuit 612 can adjust the horizontal blanking interval in advance to prevent the generated image stream from having the problem that the horizontal blanking interval is too small after being processed by the MST packet generation circuit 616.

For example, the processing circuit 623 can obtain the sizes of the horizontal blanking intervals received within a period of time (for example, the size of the horizontal blanking interval in the MST packet shown in FIG. 2), and determine whether to adjust the size of the horizontal blanking interval included in the EDID based on a minimum horizontal blanking interval among the multiple horizontal blanking intervals. If the processing circuit 623 determines that the minimum horizontal blanking interval is lower than a threshold value, the EDID adjusting circuit 626 will increase the size of the horizontal blanking interval included in the EDID read from the back-end device 630 to generate an adjusted EDID, and transmit the adjusted EDID to the image stream generation circuit 612 in the image generation device 610. Then, referring to FIG. 7, since the image stream generation circuit 612 receives the adjusted EDID with a larger horizontal blanking interval, the image stream generated by the image stream generation circuit 612 will also have a larger horizontal blanking interval. Therefore, the period from BS to the following BE in the link layer is increased, and the horizontal blanking interval in the MST packet will also become larger.

Figure 7:
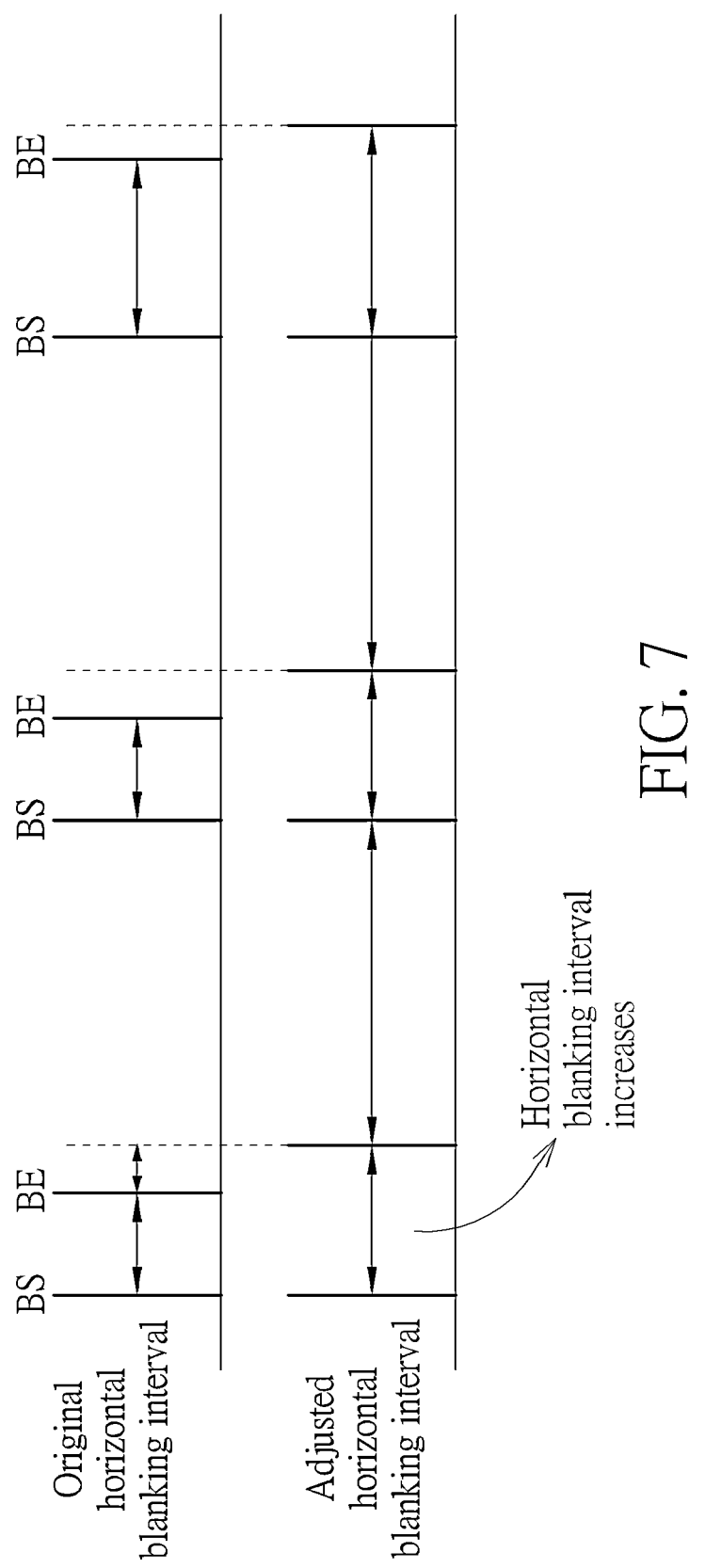
FIG. 7 is a diagram of increasing the horizontal blanking interval outputted by the image generation circuit by adjusting the EDID according to one embodiment of the present invention.

As mentioned above, by increasing the size of the horizontal blanking interval included in the EDID read from the back-end device 630 as shown in the embodiments of FIG. 6 and FIG. 7, it can solve the problem that the original horizontal blanking interval is too small and may cause the back-end device 130 to be unable to decode the control symbols and secondary data carried in the horizontal blanking interval immediately.

Similarly, the processing circuit 623 can obtain the received horizontal blanking interval sizes within a period of time, and determine whether to adjust size of the horizontal blanking interval included in the EDID according to a minimum horizontal blanking interval or a maximum horizontal blanking interval among the multiple horizontal blanking intervals. If the processing circuit 623 determines that the minimum horizontal blanking interval or the maximum horizontal blanking interval is higher than a threshold value, the EDID adjusting circuit 626 will reduce the size of the horizontal blanking interval included in the EDID read from the back-end device 630, to stabilize the size of the horizontal blanking intervals indicated in the MST packets outputted by the image generation device 610.

In addition, since the MST packet output by the image generation device 610 is generated with reference to the adjusted EDID, the horizontal blanking interval included in the adjusted EDID is not the horizontal blanking interval recorded in the original EDID of the back-end device 630. Therefore, after the relay device 620 receives the MST packet from the image generation device 610, the processing circuit 623 will reduce the horizontal blanking interval when generating the SST packet to be consistent with the horizontal blanking interval recorded in the original EDID of the back-end device 630.

Figure 8:
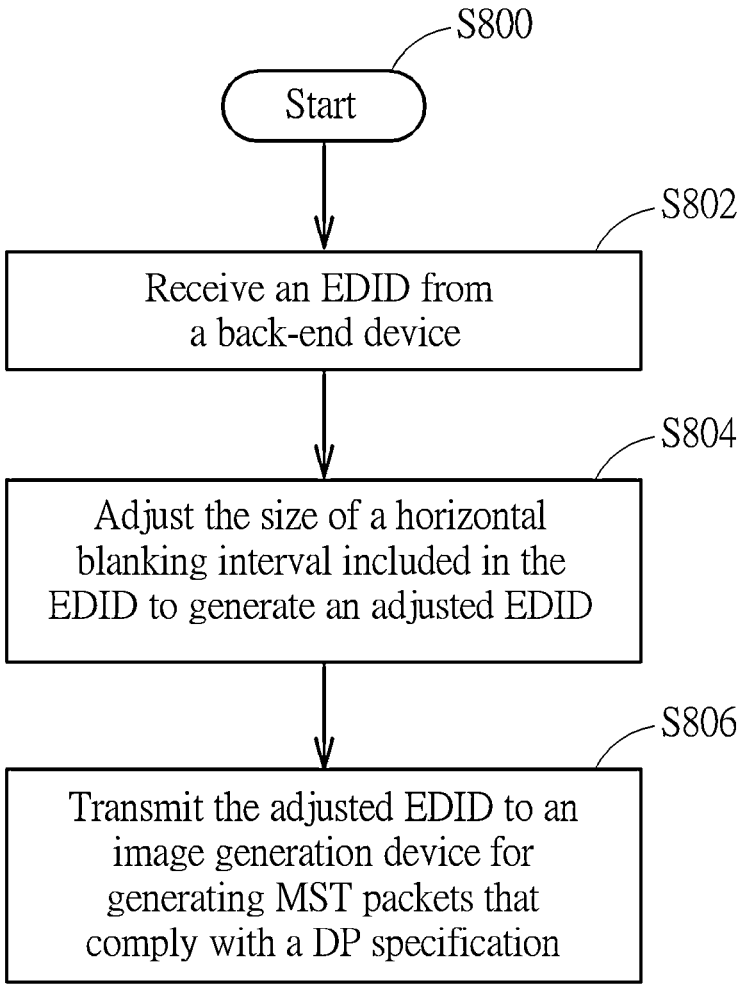
FIG. 8 is a flowchart of a signal processing method according to one embodiment of the present invention.

FIG. 8 is a flowchart of a signal processing method according to one embodiment of the present invention. Referring to the above embodiments, the flow of the signal processing method is described as follows.

Step S800: the flow starts.

Step S802: receive an EDID from a back-end device.

Step S804: adjust the size of a horizontal blanking interval included in the EDID to generate an adjusted EDID.

Step S806: transmit the adjusted EDID to an image generation device for generating MST packets that comply with a DP specification.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing method, comprising:
receiving a multi-stream transport (MST) packet that complies with a DisplayPort (DP) specification;
converting the MST packet into multiple single stream transport (SST) packets;
determining a number of valid data symbols in a transfer unit included in the multiple SST packets based on information of a horizontal blanking interval indicated by the MST packet or the multiple SST packets; and
transmitting the multiple SST packets to a back-end device.

2. The signal processing method of claim 1, wherein the step of determining the number of valid data symbols in the transfer unit included in the multiple SST packets based on the information of the horizontal blanking interval indicated by the MST packet or the multiple SST packets comprises:
if the MST packet or the multiple SST packets indicate that the horizontal blanking interval is higher than a threshold value, determining that the multiple SST packets have a first transfer unit; and
if the MST packet or the multiple SST packets indicate that the horizontal blanking interval is lower than the threshold value, determining that the multiple SST packets have a second transfer unit;
wherein the second transfer unit has a same size as the first transfer unit, and the number of valid data symbols included in the second transfer unit is higher than the number of valid data symbols included in the first transfer unit.

3. The signal processing method of claim 1, wherein the information of the horizontal blanking interval comprises multiple horizontal blanking intervals; and the step of determining the number of valid data symbols in the transfer unit included in the multiple SST packets based on the information of the horizontal blanking interval indicated by the MST packet or the multiple SST packets comprises:
determining the number of valid data symbols in the transfer unit included in the multiple SST packets based on a minimum horizontal blanking interval among the multiple horizontal blanking intervals.

4. The signal processing method of claim 1, wherein the multiple SST packets comprise a first transfer unit; and the step of determining the number of valid data symbols in the transfer unit included in the multiple SST packets based on the information of the horizontal blanking interval indicated by the MST packet or the multiple SST packets comprises:
if the MST packet or the multiple SST packets indicate that the horizontal blanking interval is lower than a threshold value, adjusting a number of valid data symbols in the first transfer unit to make the multiple SST packets have a second transfer unit;
wherein the second transfer unit has a same size as the first transfer unit, and the number of valid data symbols included in the second transfer unit is higher than the number of valid data symbols included in the first transfer unit.

5. A relay device, comprising:
a receiving circuit, configured to receive a multi-stream transport (MST) packet that complies with a DisplayPort (DP) specification;
a processing circuit, coupled to the receiving circuit, configured to convert the MST packet into multiple single stream transport (SST) packets, and determine a number of valid data symbols in a transfer unit included in the multiple SST packets based on information of a horizontal blanking interval indicated by the MST packet or the multiple SST packets; and a transmitting circuit, configured to transmit the multiple SST packets to a back-end device.

6. The relay device of claim 5, wherein if the MST packet or the multiple SST packets indicate that the horizontal blanking interval is higher than a threshold value, the processing circuit determines that the multiple SST packets have a first transfer unit; and if the MST packet or the multiple SST packets indicate that the horizontal blanking interval is lower than the threshold value, the processing circuit determines that the multiple SST packets have a second transfer unit, wherein the second transfer unit has a same size as the first transfer unit, and the number of valid data symbols included in the second transfer unit is higher than the number of valid data symbols included in the first transfer unit.

7. The relay device of claim 5, wherein the information of the horizontal blanking interval comprises multiple horizontal blanking intervals, and the processing circuit determines the number of valid data symbols in the transfer unit included in the multiple SST packets based on a minimum horizontal blanking interval among the multiple horizontal blanking intervals.

8. The relay device of claim 5, wherein the multiple SST packets comprise a first transfer unit; and if the MST packet or the multiple SST packets indicate that the horizontal blanking interval is lower than a threshold value, the processing circuit adjusts a number of valid data symbols in the first transfer unit to make the multiple SST packets have a second transfer unit, wherein the second transfer unit has a same size as the first transfer unit, and the number of valid data symbols included in the second transfer unit is higher than the number of valid data symbols included in the first transfer unit.

\* \* \* \* \*